Figure 1:
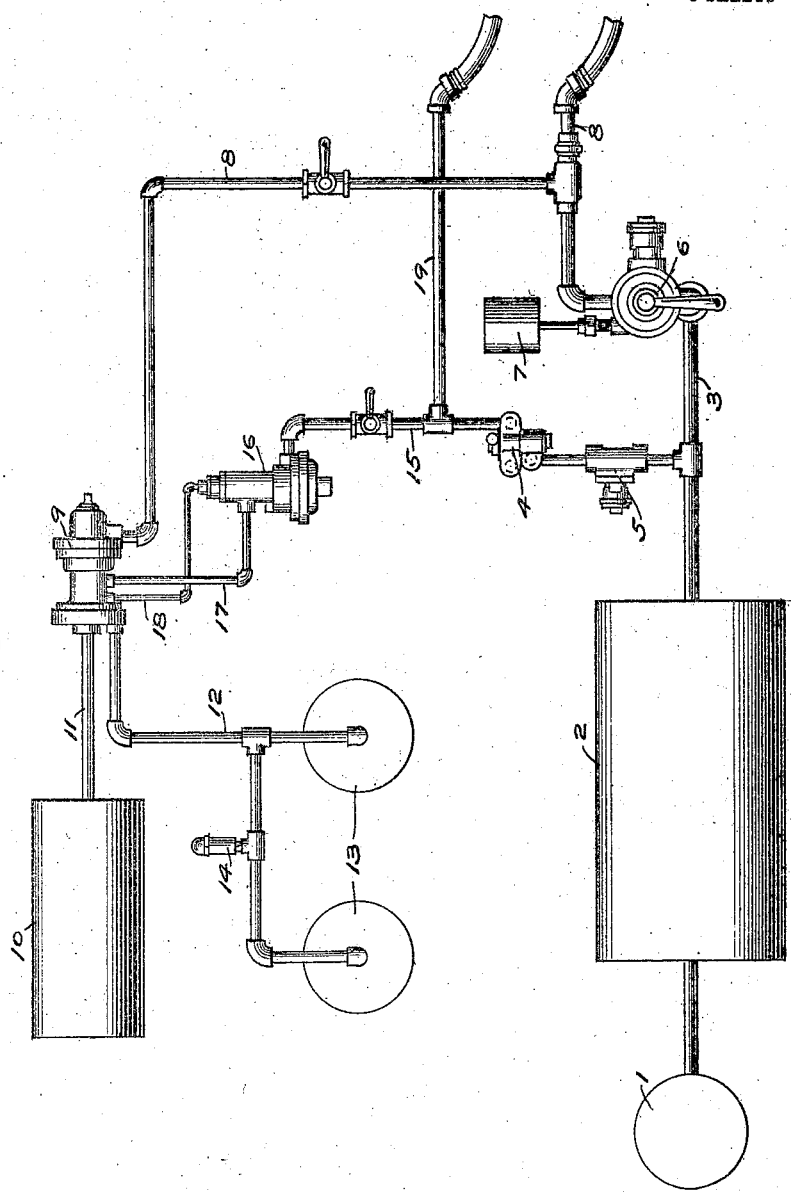

No. 842,923. PATENTED FEB. 5, 1907.
W. V. TURNER & E. A. WRIGHT.
COMBINED AUTOMATIC AND STRAIGHT AIR BRAKE.
APPLICATION FILED MAY 6, 1904.

3 SHEETS—SHEET 1.

WITNESSES
INVENTORS
Walter V. Turner
Edward A. Wright
by E. A. Wright

No. 842,923. PATENTED FEB. 5, 1907.
W. V. TURNER & E. A. WRIGHT.
COMBINED AUTOMATIC AND STRAIGHT AIR BRAKE.
APPLICATION FILED MAY 6, 1904.
3 SHEETS—SHEET 2.
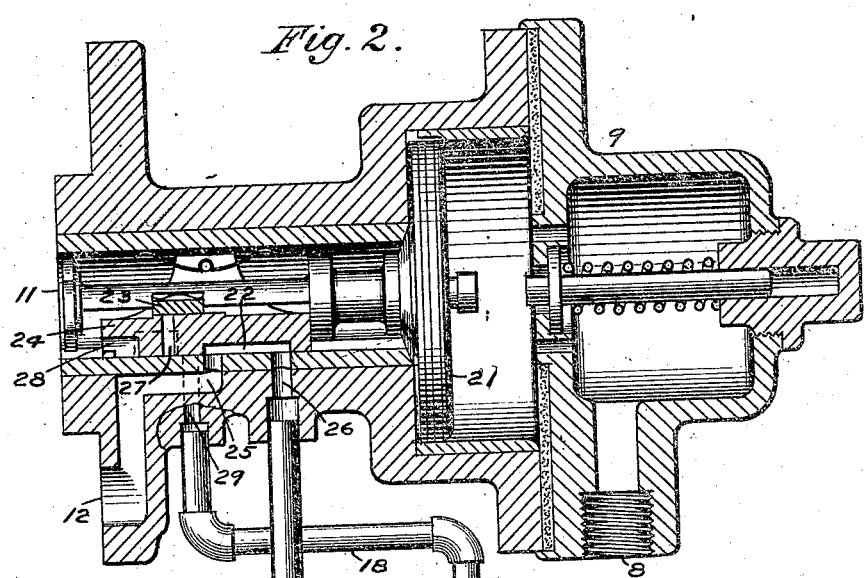
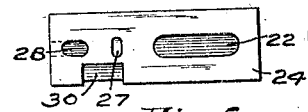
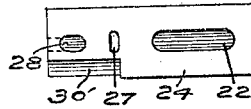
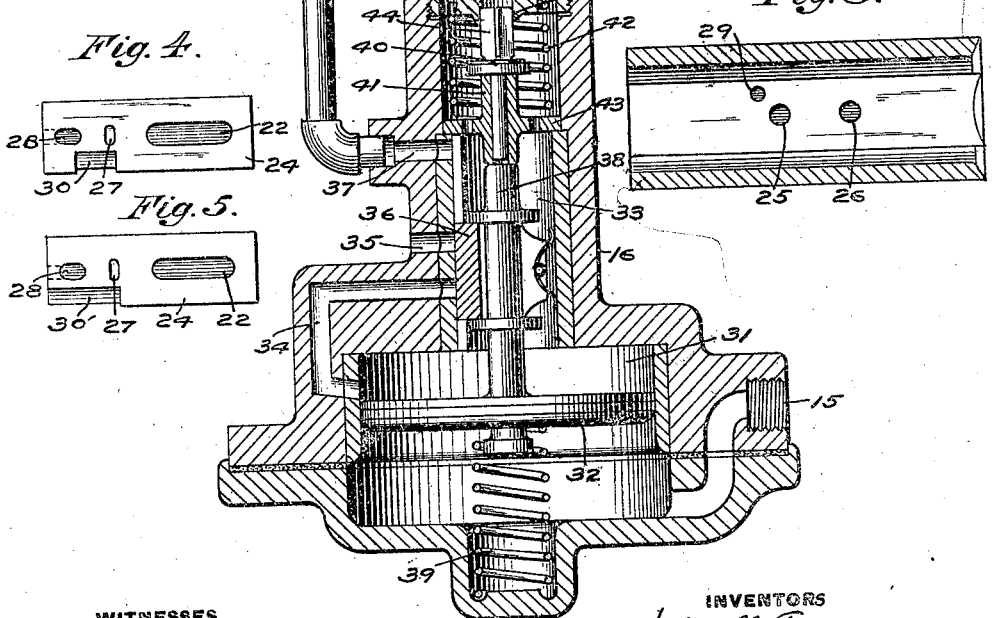
WITNESSES
INVENTORS
Walter V. Turner
Edward A. Wright
by E. Wright Att'y.

No. 842,923. PATENTED FEB. 5, 1907.
W. V. TURNER & E. A. WRIGHT.
COMBINED AUTOMATIC AND STRAIGHT AIR BRAKE.
APPLICATION FILED MAY 6, 1904.
3 SHEETS—SHEET 3.
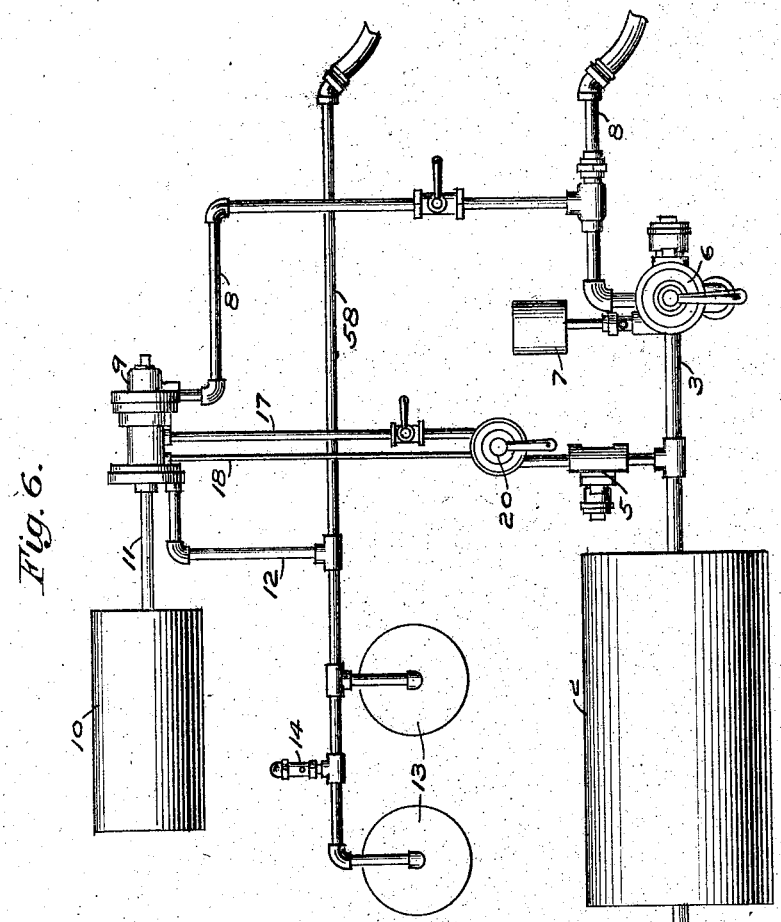
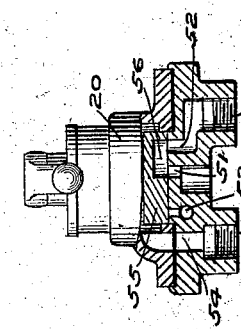
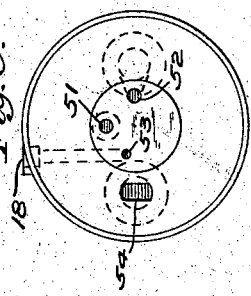
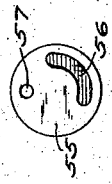
WITNESSES
INVENTORS
Walter V. Turner
Edward A. Wright
by E. Wright

UNITED STATES PATENT OFFICE.

WALTER V. TURNER, OF WILKINSBURG, AND EDWARD A. WRIGHT, OF EDGEWOOD PARK, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

COMBINED AUTOMATIC AND STRAIGHT-AIR BRAKE.

No. 842,923.     Specification of Letters Patent.     Patented Feb. 5, 1907.

Application filed May 6, 1904. Serial No. 206,655.

*To all whom it may concern:*

Be it known that we, WALTER V. TURNER and EDWARD A. WRIGHT, citizens of the United States, residing, respectively, at Wilkinsburg and Edgewood Park, both in the county of Allegheny and State of Pennsylvania, have invented a certain new and useful Improvement in a Combined Automatic and Straight-Air Brake, of which the following is a specification.

This invention relates in general to airbrakes, and more particularly to combined automatic and straight-air-brake apparatus by means of which the brakes may be applied either automatically by reducing the train-pipe pressure in the usual way or by the use of straight air direct from the main reservoir or source of supply to the brake-cylinder. In the present standard Westinghouse equipment of this type for locomotives the pipe for supplying air from the straight-air-brake valve to the brake-cylinder is connected, by means of a double check-valve, with the pipe leading from the triple valve to the brake-cylinder, so that when the brakes are applied with straight air the check-valve moves over and closes the passage to the triple valve; but when the automatic system is used for supplying air from the triple valve to the brake-cylinder the check-valve moves to its opposite seat and closes the pipe or passage to the straight-air-brake valve.

When the automatic brake is applied, it is often desirable to be able to release the same upon the locomotive by applying the straight air; but with the present equipment the engineer has no means of knowing what degree of air-pressure must be supplied by the straight-air-brake valve in order to shift the double check-valve, and it is therefore uncertain whether he can gain control of the braking pressure with the straight-air-brake valve without applying an excessive degree of straight-air pressure.

One of the objects of this invention is to provide a combined apparatus by means of which the automatic brake may be released automatically by the movement of the straight-air-brake valve to application position.

Another object is to prevent the possibility of adding to the locomotive brake-cylinder pressure by an ordinary service application of the automatic brake when the straight-air brake is already applied, and thereby prevent excessive braking pressure, which might cause damage by the sliding of the wheels or the slipping of the driving-wheel tires; and a further object is to be able at all times to secure the emergency application of the automatic brakes regardless of the position of the straight-air-brake valve.

In the accompanying drawings, Figure 1 is a diagrammatic view showing a combined automatic and straight-air-brake locomotive equipment embodying one form of this invention; Fig. 2, a sectional view of the triple valve and valve device connected therewith, as shown in Fig. 1; Fig. 3, a plan view of the main slide-valve seat of the triple valve; Fig. 4, a face view of the main slide-valve; Fig. 5, a similar face view of the slide valve, showing a slight modification; Fig. 6, a diagrammatic view showing a combined automatic and straight-air-brake equipment embodying another form of our invention; Fig. 7, a sectional view of the rotary straight-air-brake valve; Fig. 8, a plan view of the rotary-valve seat, and Fig. 9 a face view of the rotary valve of the straight-air-brake valve.

According to the construction herein shown the invention comprises a connection from the straight-air-brake valve to the triple-valve device, whereby the exhaust from the triple valve may be controlled by the straight-air-brake valve, and air from the straight-air-brake valve is supplied to the brake-cylinder through the exhaust-cavity of the triple valve.

For the purpose of causing the movement of the triple valve to release position when the straight air is applied any means, such as an additional port from the triple-valve chamber, which is open in the service position of the triple valve, may be provided for releasing air from the auxiliary reservoir, such means being controlled by the movement of the straight-air-brake valve.

As shown in Fig. 1, this invention is designed to be applied to the present standard combined automatic and straight-air brake equipment having the usual form of straight-air-brake valve 4, main reservoir 2, air-pump 1, main-reservoir pipe 3, reducing-valve 5, engineer's brake valve 6, equalizing-reservoir 7, train-pipe 8, and triple valve 9, connected to the auxiliary reservoir 10 by pipe 11 and to the brake-cylinders 13 by pipe 12, having safety-valve 14. According to this form of the improvement the pipe 15, leading from the straight-air-brake valve, is connected with an intermediate valve device 16, which is connected to the triple-valve exhaust-port by a pipe 17 and to another port in the triple valve, to be hereinafter described, by a pipe 18, a branch pipe 19 leading from the pipe 15 to a similar valve device on the locomotive-tender.

The triple-valve device may be of the usual construction, comprising piston 21, main slide-valve 24, graduating slide-valve 23, the main-valve seat, having port 25, connected to brake-cylinder pipe 12, and exhaust-port 26, connected to pipe 17, while the slide-valve 24 is provided with the usual service-port 27, emergency-port 28, and exhaust-cavity 22. An additional vent-port 29 is located in the valve-seat and is adapted to coöperate with a port 30 in the main slide-valve. According to this form of the improvement the intermediate valve device 16 comprises a casing containing a piston-chamber 31 and valve-chamber 33, with piston 32, stem 38, and slide-valve 36, controlling exhaust-port 35 and port 34, adapted to open communication from the pipe 15 and the chamber below the piston to the valve-chamber when the piston moves upward. A constantly-open port 37 connects the valve-chamber with the pipe 17 and the exhaust-port of the triple valve. A cross-head 43, having a stem 41, carrying a valve 40, is mounted in the upper part of the casing and is normally forced to its lowermost position by spring 42, at which point it rests upon the bushing or stops in the valve-casing. The valve 40 controls a port leading from the valve-chamber 33 to the chamber 48 and the atmosphere through port 49. An oppositely-seated valve 46 controls communication from pipe 18 and chamber 50 to the chamber 48 and the atmosphere. The stems 44 and 47 of the respective valves are adapted to engage each other and are of sufficient length to insure the opening of one valve when the other is closed.

The operation of this form of the invention is as follows: When it is desired to apply the brakes with straight air, the valve 4 is turned to application position, and air from main-reservoir pipe 3 flows through the reducing-valve 5 to pipe 15 and into chamber 31 beneath piston 32, forcing the same to its upper position, and thereby opening by-pass port 34 and closing valve 40 upon its seat 45. The exhaust-port 35 remains closed by the slide-valve 36, and the air passes through port 37, pipe 17, exhaust-port 26, and cavity 22 of the triple valve, brake-cylinder port 25, and pipe 12 to the brake-cylinder, charging the same to the desired pressure. As the pressure equalizes on opposite sides of piston 32 the spring 42 returns the piston and slide-valve to its normal position, as shown in Fig. 2; but the valve 40 remains closed and is held to its seat by the brake-cylinder pressure, which also obtains in the valve-chamber 33, the valve 46 being held open by the stem 44 engaging the stem 47. When the straight-air-brake valve is turned to release position, the air in pipe 15 and beneath the piston 32 escapes to the atmosphere, and the piston is forced downward against the light spring 39, thereby opening the exhaust-port 35 and releasing the air under pressure from the brake-cylinder and valve-chamber 33 to the atmosphere, after which the spring 39 returns the piston to normal position, and the valve 40 opens by gravity.

In the foregoing description it was supposed that the triple valve was in its normal release position; but if it should happen that the triple valve is in service position, due to an application of the automatic brake having been made, then the air flows from the straight-air-brake valve 4 through pipe 15 into chamber 31 and operates the piston 32, as before, to close the valve 40 and open the valve 46. The triple valve being in service position, it will be noticed that the port 30 registers with port 29, so that the opening of valve 46 permits a reduction of auxiliary-reservoir pressure to the atmosphere, which causes the triple valve to instantly move to release position, thereby closing vent-port 29 and connected ports 26 and 25 through the exhaust-cavity 22. The brake-cylinder pressure is then controlled by the straight-air-brake valve and may be increased or diminished, as desired, while the automatic train-brakes may be retained or released at will by the engineer's brake-valve 6. By this means it will be seen that the locomotive automatic brake may be released at any time by the straight-air-brake valve without releasing the train-brakes, thereby securing practically an independent control of the driver-brakes.

The automatic brake system is controlled by the regular engineer's brake-valve 6 in the usual way, the port 29 and pipe 18 being normally held closed by the valve 46 to prevent the escape of air from the auxiliary reservoir to the atmosphere. In case the straight-air brake should already be applied on the locomotive at the time that a service application of the automatic brakes is made with the engineer's brake-valve 6, the slide-valve 24 of the driver-brake triple valve 9 moves back only a slight distance, when the port 30 registers with port 29 and pipe 18, which permits the auxiliary reservoir to reduce to the atmosphere as rapidly as the train-pipe pressure reduces, since the valve 46 is open at this time, thereby preventing a movement of the triple-valve sufficient to open the service-port to supply additional air from the auxiliary reservoir to the brake-cylinder. In this way the auxiliary-reservoir pressure reduces slightly below that of the train-pipe, and the piston and slide-valve then return to release position, closing port 29 and leaving the locomotive-brakes under the control of the straight-air-brake valve without increasing the brake-cylinder pressure on the locomotive, although the train-brakes will be applied as usual.

Should occasion require an emergency application of the automatic train-brakes to be made while the locomotive-brakes are applied with straight air, a sudden reduction in train-pipe pressure would cause the triple piston 21 and valve 24 to instantly make a full traverse to emergency position, in which the port 28 registers with brake-cylinder port 25, and the auxiliary-reservoir pressure equalizes into the brake-cylinder. During this movement of the slide-valve 24 the port 30 passes over the port 29 so rapidly that very little or no air escapes from the auxiliary reservoir through pipe 18, and this outlet is then held closed by the valve in emergency position. If it is desired to be able to release the driver-brake triple valve by means of straight air after an emergency application, this vent-port in the slide-valve may be extended, as indicated at 30' in Fig. 5, so as to leave the port 29 open in the emergency position, and in this case the air from the auxiliary reservoir would rush into the pipe 18 with sufficient force to seat the valve 46 and open valve 40, thereby releasing the valve-chamber 33 to the atmosphere and preventing further escape of air from the auxiliary reservoir. Then the driver-brake triple may be released by supplying air from the straight-air-brake valve through pipe 15 to piston 32, whereby the same is forced upward to close valve 40 and unseat the valve 46, which opens communication from the auxiliary reservoir to the atmosphere through ports 30' 29 and pipe 18 and causes the movement of the triple-valve to release position, as before described. The preferable form of slide-valve, however, is shown in Figs. 2 and 4, in which the port 29 is closed by the valve in emergency position. The branch pipe 19 leads to a similar valve device 16 on the tender, whereby the tender-brakes may be controlled by the straight-air-brake valve at the same time as the driver-brakes.

The construction of the improvement as thus far described is designed to be applied to the present standard apparatus and the form of straight-air-brake valve now in use. In Figs. 6 to 9, however, is illustrated a modification of our invention, in which a rotary straight-air-brake valve 20 is employed and the automatic valve device 16 dispensed with.

According to this modification the valve-seat of the straight-air-brake valve is provided with exhaust-port 51, application-port 52, connected directly to pipe 17, and the triple-valve exhaust, and port 53, connected directly to pipe 18, leading to the additional port 29 of the triple valve, the rotary valve-chamber being connected by port 54 with the main-reservoir pipe 3 through the reducing-valve, as usual. The rotary valve 55 is provided with a through-port 57 and a cavity 56 for coöperating with the ports in the valve-seat. When this rotary valve of the straight-air-brake valve is in release position, the ports 52 and 51 are connected by the cavity 56, while the port 53 is closed, so that the automatic brakes may then be applied and released in the usual way by the engineer's brake-valve 6.

When it is desired to apply the locomotive-brakes by straight air, the rotary valve 55 is turned to application position, in which port 57 registers with port 52, while the port 53 communicates with the atmosphere through cavity 56. If the triple valve is in release position, air then flows through pipes 17 and 12 to the driver-brake cylinders 13 and through branch pipe 58 to the brake-cylinder on the tender, charging the same to any desired degree. If the triple valve should be in service position, air from the auxiliary reservoir would immediately vent to the atmosphere through pipe 18, port 53, cavity 56, and port 51, thereby causing the triple valve to instantly move to release position and connect ports 25 and 26 for supplying straight air to the brake-cylinders. The rotary valve 55 is then turned to lap position, in which the application-port 52 is closed but the port 53 still remains in communication with the exhaust-port 51 through the cavity 56. If a service application should then be made with the straight-air brake applied, the slide-valve of the locomotive triple valve would only move sufficiently to open port 29 and release a certain amount of air from the auxiliary reservoir to the atmosphere through pipe 18 and ports 53, 56, and 51 and then return to release position, closing port 29, as before described, without supplying air from the auxiliary reservoir to the brake-cylinder. The air in the brake-cylinders may then be released at any time by turning the straight-air-brake valve to release position, connecting ports 52 and 51 through the cavity 56.

An emergency application of the automatic brakes may be made at any time whether the straight-air brake is applied or not by a sudden reduction in train-pipe pressure, which causes the slide-valve 24, Figs. 2 and 4, of the driver-brake triple-valve to move rapidly over port 29 to its emergency position, in which the said vent-port 29 is closed.

From the foregoing description it will now be apparent that we have provided a combined automatic and straight-air brake equipment for locomotives by means of which the engineer may release the automatic locomotive-brake with the straight-air-brake valve, while the train-brakes are applied and without releasing them and then control the locomotive-brakes with straight air. He is also able to release the automatic train-brakes for the purpose of recharging the auxiliary reservoirs while holding the locomotive-brakes applied with straight air and without increasing the pressure in the locomotive brake-cylinders and at the same time may secure an emergency application of the automatic brakes on both the locomotive and train at any time by the usual sudden reduction in train-pipe pressure, thereby insuring a safe and complete control of the train under all conditions.

Having now described our invention, what we claim as new, and desire to secure by Letters Patent, is—

1. In an air-brake, the combination with a train-pipe, engineer's brake-valve, auxiliary reservoir, triple valve and brake-cylinder, of a straight-air-brake valve for supplying air to the brake-cylinder, and means controlled by the straight-air-brake valve for venting air from the auxiliary reservoir to cause the movement of the triple valve to release position.

2. In an air-brake, the combination with a train-pipe, engineer's brake-valve, auxiliary reservoir, triple valve and brake-cylinder, of a straight-air-brake valve and a pipe leading therefrom to the triple-valve exhaust-port for supplying air to the brake-cylinder, and means controlled by the straight-air-brake valve for venting air from the auxiliary reservoir to cause the movement of the triple valve to release position.

3. In an air-brake, the combination with a train-pipe, engineer's brake-valve, auxiliary reservoir, triple valve and brake-cylinder, of a straight-air-brake valve, and means controlled by the straight-air-brake valve for causing the movement of the triple valve to release position.

4. The combination with an automatic air-brake system, and a straight-air-brake apparatus, of means for preventing a further supply of air to the brake-cylinder by the automatic system in service applications when the brake is applied with straight air.

5. In an air-brake, the combination with a train-pipe, engineer's brake-valve, auxiliary reservoir, triple valve and brake-cylinder, of a straight-air-brake valve and means operated by the movement of the straight-air-brake valve to service position when the triple valve is in service position for automatically causing the release of the triple valve.

6. In an air-brake, the combination with a train-pipe, engineer's brake-valve, auxiliary reservoir, brake-cylinder and a triple valve having a vent-port for the auxiliary reservoir adapted to be open in lap position, of a straight-air-brake valve, and means operated thereby for controlling said vent-port from the auxiliary reservoir, and for supplying air through the triple-valve exhaust to the brake-cylinder.

7. In an air-brake, the combination with a train-pipe, engineer's brake-valve, auxiliary reservoir, triple valve and brake-cylinder, of a straight-air-brake valve for supplying air to the exhaust-port of the triple valve, and means controlled by the straight-air-brake valve for venting air from the auxiliary reservoir when the triple valve is in service position.

8. In an air-brake, the combination with a main reservoir, engineer's brake-valve, train-pipe, auxiliary reservoir, triple valve and brake-cylinder, of a straight-air-brake valve for supplying air to the brake-cylinder, and means controlled by the triple valve for venting air from the auxiliary reservoir when the straight-air brake is applied.

9. In an air-brake, the combination with a main reservoir, engineer's brake-valve, train-pipe, auxiliary reservoir, triple valve and brake-cylinder, of a straight-air-brake valve for supplying air to the brake-cylinder, and means operated by a reduction in train-pipe pressure for venting air from the auxiliary reservoir when the straight-air brake is applied.

10. In an air-brake, the combination with a main reservoir, engineer's brake-valve, train-pipe, auxiliary reservoir and brake-cylinder, of a triple-valve device having ports for supplying air from the auxiliary reservoir to the brake-cylinder and for venting air from the auxiliary reservoir to the atmosphere, and a straight-air-brake valve for supplying air to the brake-cylinder and having means for controlling said vent-port.

11. In an air-brake, the combination with a main reservoir, engineer's brake-valve, train-pipe, auxiliary reservoir and brake-cylinder, of a triple-valve device having a vent-port for releasing air from the auxiliary reservoir, and a straight-air-brake valve having means for supplying air to the exhaust-port of the triple valve and for controlling the outlet from the said vent-port of the triple valve.

12. In an air-brake, the combination with a main reservoir, engineer's brake-valve, train-pipe, auxiliary reservoir and brake-cylinder, of a triple-valve device having a vent-port for releasing air from the auxiliary reservoir, and a straight-air-brake valve having ports connected to the exhaust-port and to the said vent-port of the triple-valve device.

13. In an air-brake, the combination with a main reservoir, engineer's brake-valve, train-pipe, auxiliary reservoir and brake-cylinder, of a triple-valve device having a vent-port for releasing air from the auxiliary reservoir, and a straight-air-brake valve having ports for supplying air direct to the triple-valve exhaust-port and for establishing communication from the triple-valve vent-port to the atmosphere in application and lap positions.

14. In an air-brake, the combination with a main reservoir, engineer's brake-valve, train-pipe, auxiliary reservoir, and brake-cylinder, of a triple-valve device having a service-port for supplying air to the brake-cylinder, and a vent-port adapted to open in advance of the service-port for releasing air from the auxiliary reservoir, and a straight-air-brake valve for supplying air to the brake-cylinder, and controlling the outlet from said triple-valve vent-port 15. In an air-brake, the combination with a main reservoir, engineer's brake-valve, train-pipe, auxiliary reservoir and brake-cylinder, of a triple-valve device having a vent-port adapted to be opened for releasing air from the auxiliary reservoir to the atmosphere by the movement of the valve to service-application position, and to be closed by the further movement of the valve to emergency position, and a straight-air-brake valve for supplying air to the brake-cylinder.

In testimony whereof we have hereunto set our hands.

WALTER V. TURNER.
EDWARD A. WRIGHT.

Witnesses:
R. F. EMERY,
JAS. B. MACDONALD.